(12) United States Patent
Wang et al.

(10) Patent No.: US 10,256,976 B2
(45) Date of Patent: Apr. 9, 2019

(54) METHOD AND APPARATUS FOR INFORMATION INTERACTION

(71) Applicant: I-PATROL TECHNOLOGY LIMITED, Hong Kong (CN)

(72) Inventors: Yi Wang, Hong Kong (CN); Ching Lap Chan, Hong Kong (CN)

(73) Assignee: I-Patrol Technology Limited, Hong Kong (CN)

( * ) Notice: Subject to any disclaimer, the term of this patent is extended or adjusted under 35 U.S.C. 154(b) by 468 days.

(21) Appl. No.: 14/705,186

(22) Filed: May 6, 2015

(65) Prior Publication Data

US 2015/0236855 A1   Aug. 20, 2015

Related U.S. Application Data

(63) Continuation of application No. PCT/CN2013/073250, filed on Mar. 27, 2013.

(30) Foreign Application Priority Data

Feb. 4, 2013   (CN) .......................... 2013 1 0044332

(51) Int. Cl.
*H04L 9/32* (2006.01)
*H04L 29/06* (2006.01)
*G06Q 50/00* (2012.01)

(52) U.S. Cl.
CPC .......... *H04L 9/3234* (2013.01); *H04L 9/3231* (2013.01); *H04L 63/0853* (2013.01); *H04L 63/0861* (2013.01); *G06Q 50/01* (2013.01)

(58) Field of Classification Search
USPC ........ 713/172, 150, 163, 181; 726/2, 21, 36; 380/255, 264, 276
See application file for complete search history.

(56) References Cited

U.S. PATENT DOCUMENTS

2004/0128502 A1* 7/2004 Royer ..................... G06F 21/32
                                                        713/156
2007/0239994 A1* 10/2007 Kulkarni ............... G06F 21/602
                                                        713/189

(Continued)

FOREIGN PATENT DOCUMENTS

| CN | 102098539 A | 6/2011 |
| CN | 102542449 A | 7/2012 |
| CN | 102867374 A | 1/2013 |

OTHER PUBLICATIONS

International Search Report of Application No. PCT/CN2013/073250, from the State Intellectual Property Office of China, dated Nov. 21, 2013.

(Continued)

*Primary Examiner* — Sharif E Ullah
(74) *Attorney, Agent, or Firm* — Finnegan, Henderson, Farabow, Garrett & Dunner LLP

(57) ABSTRACT

An information interaction method, includes: obtaining, by an encryption accessory, one or more user features, the encryption accessory including a hardware logic circuit; performing, by the hardware logic circuit, a logical operation on the one or more user features to generate a hardware function; and using the hardware function for an access authentication by a social networking service (SNS) server.

12 Claims, 9 Drawing Sheets

(56) References Cited

U.S. PATENT DOCUMENTS

| | | | |
|---|---|---|---|
| 2008/0086639 A1* | 4/2008 | Kono | G06F 21/72 713/168 |
| 2008/0235515 A1* | 9/2008 | Yedidia | G06K 9/00073 713/186 |
| 2009/0183008 A1* | 7/2009 | Jobmann | H04L 9/0866 713/186 |
| 2009/0287930 A1* | 11/2009 | Nagaraja | H04L 9/08 713/171 |
| 2011/0078184 A1* | 3/2011 | Song | G06Q 10/107 707/770 |
| 2012/0303966 A1* | 11/2012 | Hubner | G06Q 20/40145 713/186 |
| 2013/0173710 A1* | 7/2013 | Seo | H04L 67/12 709/204 |
| 2013/0238906 A1* | 9/2013 | Khoury | G06F 21/6218 713/193 |

OTHER PUBLICATIONS

Written Opinion of the International Searching Authority for Application No. PCT/CN2013/073250, from the State Intellectual Property Office of China, dated Nov. 21, 2013.

\* cited by examiner

METHOD AND APPARATUS FOR INFORMATION INTERACTION

CROSS REFERENCE TO RELATED APPLICATIONS

The present application is a continuation of International Application No. PCT/CN2013/073250, filed Mar. 27, 2013, which is based upon and claims priority to Chinese Patent Application No. 201310044332.5, filed Feb. 4, 2013, the entire contents of all of which are incorporated herein by reference.

TECHNICAL FIELD

This disclosure generally relates to the network communication field and, more particularly, to an encryption method and apparatus for information interaction.

BACKGROUND

Information interaction among individuals or groups is involved in the modern digital society, and users have paid attention to information security, especially in e-commerce, e-bank, and online marketing. With the emergence of social network service (SNS), personal communications and business communications, such as emails, data transmissions in e-commerce, etc., have set new requirements to secure information exchange.

Conventionally, when a user uses the SNS for communication, such as an online chatting application, content of the online chatting may be intercepted by an unauthorized user which may result in disclosure of personal privacy. If the online chatting involves confidential business information, the resultant disclosure will have a serious consequence.

Conventionally, a lecturer may provide students with course materials using the SNS. The course materials are generally copyright protected. However, the students may still inadvertently give the material to unauthorized users. In addition, piracy or illegal use of copyright of songs, movies, software, services and electronic products can also occur.

Conventional encryption technologies and security protection platforms generally require a complex systemic integration on the server side, issuance of encryption keys, and support of data transmission to user terminals, which not only causes operation inconvenience to users but also may also increase security risk.

SUMMARY

According to a first aspect of the present disclosure, there is provided an information interaction method, comprising: obtaining, by an encryption accessory, one or more user features, the encryption accessory including a hardware logic circuit; performing, by the hardware logic circuit, a logical operation on the one or more user features to generate a hardware function; and using the hardware function for an access authentication by a social networking service (SNS) server.

According to a second aspect of the present disclosure, there is provided an information interaction method, comprising: obtaining a hardware function through a terminal, the hardware function including an encrypted user feature; and using a hardware logic circuit to decrypt the hardware function.

According to a third aspect of the present disclosure, there is provided an encryption accessory, comprising: an interface for electrically connecting to a terminal; a feature obtaining unit for obtaining one or more user features; and a hardware logic circuit for performing a logical operation on the one or more user features to generate a hardware function, and transmitting the hardware function to the terminal via the terminal interface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
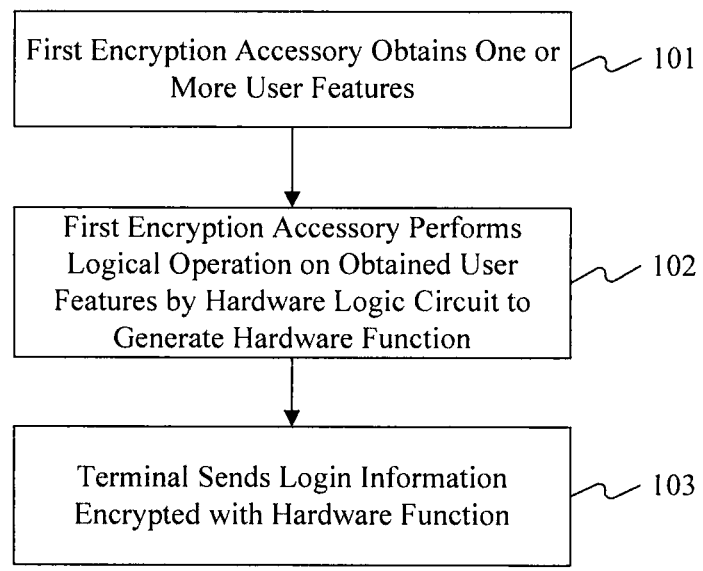
FIGS. 1-4 are flowcharts of information interaction methods, according to exemplary embodiments.

FIG. 1 is a flowchart of an information interaction method 100 for use in a device, such as a terminal in a social networking service (SNS), according to an exemplary embodiment. Referring to FIG. 1, the method 100 includes the following steps.

In step 101, a first encryption accessory to the terminal obtains one or more user features of a user. For example, the user features can be a speech feature or a fingerprint feature of the user, with no limitation here.

In the illustrated embodiment, before using the first encryption accessory in the SNS, the user needs to register with the SNS. The first encryption accessory includes a first hardware logic circuit matching a second hardware logic circuit in a server of the SNS. When the first hardware logic circuit matches the second hardware logic circuit, data encrypted by the first hardware logic circuit through a logical operation can be decrypted by the second hardware logic circuit though a corresponding logical operation. In addition, the device including the first hardware logic circuit is also considered matching the device including the second hardware logic circuit. Alternatively and/or additionally, the user can register through a second encryption accessory of another user matching the first encryption accessory according to a predetermined procedure.

As used in the present disclosure, the SNS refers to a platform, an application, or a service for information interaction among two or more individuals or groups. For example, the SNS may be an existing network service for instant communication on the Internet, or an intercommunication spontaneously established between two users, for example, by using matched encryption accessories. The matched encryption accessories can be matched during manufacture, e.g., from a same set or series of encryption accessories, or matched by the users through a predetermined authentication procedure.

In exemplary embodiments, when the user of the first encryption accessory registers with the SNS, the user may provide the SNS server or the second encryption accessory with one or more user features, to bind the user features with the hardware logic circuit of the SNS server or the second encryption accessory, that is, to store the user features for future use by the hardware logic circuit. After the registration, if the user wants to use the SNS, the user may connect the first encryption accessory to the terminal to obtain the user features through a feature acquisition unit in the first encryption accessory.

In exemplary embodiments, a hardware logic circuit can be a field-programmable gate array (FPGA). The FPGA is developed from programmable logic devices, such as programmable array logic (PAL), gate array logic (GAL), and complex programmable logic device (CPLD). The FPGA is a semi-custom circuit in the application-specific integrated circuit (ASIC) field, not only resolving certain deficiencies of conventional custom circuits, but also overcoming the disadvantage of the limited number of gate circuits of conventional programmable logic devices. Editable components in the FPGA can be used for implementing basic logic gate circuits, such as AND, OR, XOR, and NOT, and complicated combination functions, such as decoders and math equation solvers.

In step 102, the first encryption accessory performs a logical operation, e.g., a logical calculation, on the obtained user features by the hardware logic circuit to generate a hardware function, such that the terminal can generate encrypted login information of the user by encrypting the login information with the hardware function.

In step 103, the terminal sends the login information encrypted with the hardware function to the SNS server or the second encryption accessory. The encrypted login information may include a user account and a password.

In exemplary embodiments, the SNS server receives the login information encrypted with the hardware function sent from the terminal, and performs a decryption on the encrypted login information through its hardware logic circuit matching the hardware logic circuit in the first encryption accessory. If the user features obtained from the terminal are correct, the correct user features may be obtained through a successful decryption. The SNS server further performs an access authentication on the user features obtained through the decryption by, e.g., performing a comparison to determine whether the obtained user features are identical with those bound during the registration.

In the illustrated embodiment, because the user features are bound with the hardware logic circuit of the SNS server during the registration, and the hardware logic circuit of the first encryption accessory connected to the terminal matches that of the SNS server, the encrypted login information can be correctly decrypted and data security is improved for information interaction in the SNS.

In exemplary embodiments, the binding of the user features may be achieved through a reliable central server, e.g., the SNS server, or be a peer to peer binding without the central server. The binding can be achieved through the hardware logic circuit of each of the first encryption accessory and the SNS server (or another encryption accessory). Due to unduplicability of user features and uniqueness of the hardware logic circuit, the binding provides high security to transmitted data. Meanwhile, information may be exchanged/interacted securely and automatically in an encrypted form between users. Only the corresponding hardware digital logic circuits of bound users can decrypt encrypted data to obtain correct information. In addition, the users may not need to download data by themselves. Instead, data can be automatically downloaded to the users' respective terminals according to binding settings. The binding can be between hardware, between hardware and software or users, or between two or more users in a communication interaction.

Figure 2:
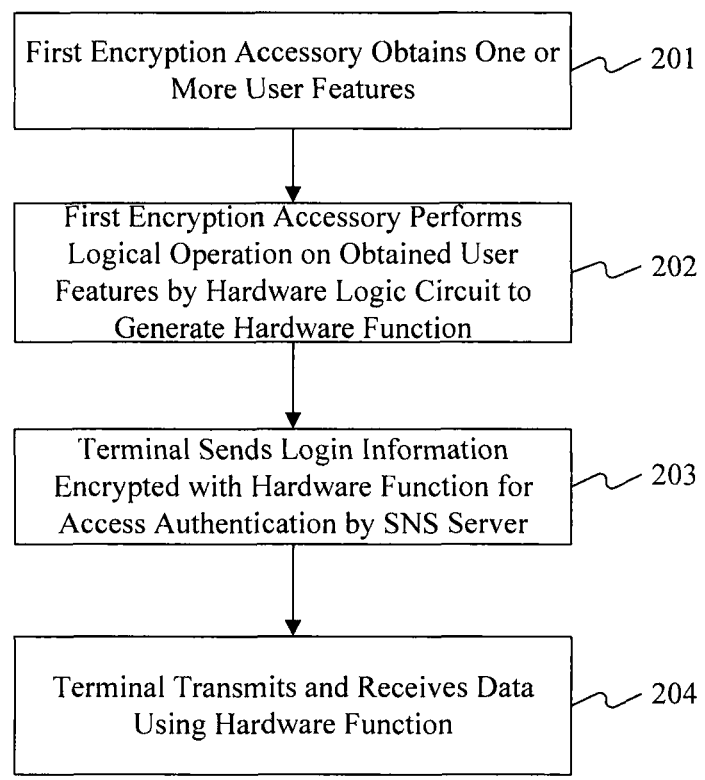

FIG. 2 is a flowchart of an information interaction method 200, according to an exemplary embodiment. Referring to FIG. 2, the method 200 includes the following steps.

In step 201, the first encryption accessory to the terminal obtains one or more user features. The obtained user features may be incompletely identical with those obtained during registration, with a fault tolerance scope. For example, the user features can be a speech feature, a fingerprint feature, a knuckle feature, a palm print feature, a face feature, or an eye iris feature, with no limitation here.

In the illustrated embodiment, the user needs to register with the SNS server before logging onto the SNS server through the first encryption accessory. The SNS provider can provide the first encryption accessory to the user, which includes a hardware logic circuit matching a hardware logic circuit in the SNS server. During the registration, the user may provide the SNS server with the user features to bind the user features with the hardware logic circuit of the SNS server. After the registration, if the user wants to log into the SNS server, the user may connect the first encryption accessory with the terminal to obtain the user features through the feature acquisition unit in the first encryption accessory.

In step 202, the first encryption accessory performs a logical operation, e.g., a logical calculation, on the obtained user features by the hardware logic circuit to generate a hardware function, such that the terminal can generate encrypted login information of the user by encrypting the login information with the hardware function.

In step 203, the terminal sends the login information encrypted with the hardware function to the SNS server or another encryption accessory for access authentication. The encrypted login information may include a user account and a password.

In exemplary embodiments, the SNS server receives the login information encrypted with the hardware function sent from the terminal and performs a decryption on the encrypted login information through a hardware logic circuit matching the hardware logic circuit in the first encryption accessory. If the user features obtained from the terminal are correct, e.g., are those of the user, the correct user features may be obtained through a successful decryption. The SNS server further performs an access authentication on the user features obtained through the decryption, by e.g., a comparison to determine whether the obtained user features are identical with those bound during the registration. If the access authentication is successful, the SNS server sends back login response information to the terminal. Accordingly, the terminal can enter a user interface of the SNS and the user can use applications in the SNS.

In step 204, the terminal uses the hardware function to transmit data to, and receive data from, the SNS server. For example, the terminal uses the hardware function to encrypt data transmitted to the SNS server. Also for example, when the terminal receives encrypted data from the SNS server, the terminal uses the hardware function to decrypt the encrypted data to obtain decrypted data.

In the illustrated embodiment, the hardware function may be used by a sender, e.g., the terminal, for encryption of data, and a receiver of the encrypted data, such as the SNS server, can use a hardware function matching the hardware logic circuit of the sender to decrypt the encrypted data. For example, the receiver is provided with user features and performs a logical operation on the user features through a hardware logic circuit in an encryption accessory of the receiver to obtain a hardware function to decrypt the received encrypted data. The hardware function of the receiver may be generated by the hardware logic circuit of the receiver of the receiver that matches the hardware logic circuit of the sender, or by software of the receiver that matches the software of the sender. The matching may be one sender matching one receiver, one sender matching multiple receivers, or multiple senders matching one receiver. The data transmitted between the sender and the receiver may be chatting content between users, or media content, such as documents, videos, and audios.

In one exemplary embodiment, the SNS is a service for sharing teaching materials, and a lecturer uses the SNS to provide students with documents related to courses. When the lecturer uploads the documents to the SNS server, in order to protect the documents from unauthorized use, the lecturer can use an encryption accessory to generate a hardware function through a hardware logic circuit in the encryption accessory, use the hardware function to encrypt the documents, and upload the encrypted documents to the SNS server. Before receiving the documents, the students will register their respective user features with the SNS server, and receive their respective encryption accessories that each include a hardware logic circuit matching the hardware logic circuit of the encryption accessory of the lecturer. The encryption accessories may also be provided with a data storage function. If a student needs to download the documents from the SNS server, the student can connect his/her encryption accessory to a terminal. The encryption accessory obtains user features of the student and uses the hardware logic circuit in the encryption accessory to perform a logical operation on the user features to generate a hardware function. The encryption accessory can encrypt login information of the student for the terminal to transmit the encrypted login information to the SNS server. After the login is successful, the student can download the encrypted documents from the SNS server.

In another embodiment, the encryption accessories of the students are bound to the encryption accessory of the lecturer, to provide additional control, such as an automatic update mechanism. Thus, as long as there is an update on the documents on the lecturer side, and the encryption accessories of the students are activated to verify the students' user features, the update can be automatically downloaded from a terminal of the lecturer.

When a student needs to open the downloaded documents, the student can save the downloaded documents to his/her terminal and open the documents through a hardware function generated by the encryption accessory connected to the terminal. Alternatively, the student can save the downloaded documents to the encryption accessory, for the terminal to open in the encryption accessory.

Figure 3:
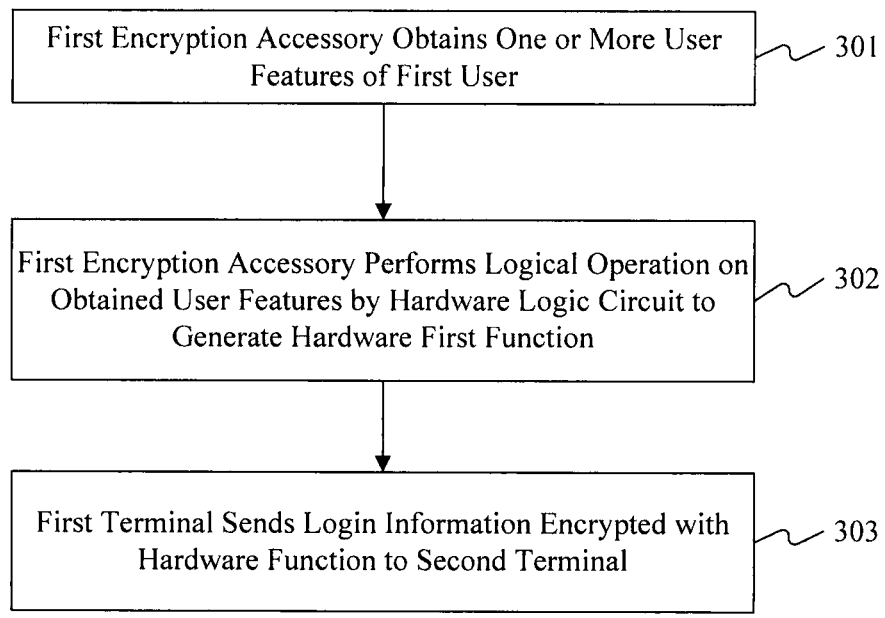

FIG. 3 is a flowchart of an information interaction method 300, according to an exemplary embodiment. Referring to FIG. 3, the method 300 includes the following steps.

In step 301, a first encryption accessory to a first terminal obtains one or more user features of a first user. The obtained user features may be incompletely identical with that which the first user provided during registration, with a fault tolerance scope. For example, the user features can be a speech feature, a fingerprint feature, a knuckle feature, a palm print feature, a face feature, or an eye iris feature, with no limitation here.

In the illustrated embodiment, before the first user communicates with a second user through the first encryption accessory, a registration is needed in which a binding is formed between the first encryption accessory and a second encryption accessory used by the second user, i.e., the first encryption accessory of the first user stores user features of the second user, and the second encryption accessory of the second user stores user features of the first user. After the registration, when the first user wants to communicate with the second user, the first user may connect the first encryption accessory with the first terminal, to obtain one or more user features of the first user through a feature acquisition unit in the first encryption accessory.

In step 302, the first encryption accessory performs a logical operation on the user features by a first hardware logic circuit in the first encryption accessory to generate a first hardware function. The first terminal then generates encrypted login information by encrypting login information with the first hardware function.

In step 303, the first terminal sends the encrypted login information to the second terminal. For example, the encrypted login information includes a user account and a password.

In exemplary embodiments, the second user connects the second encryption accessory with a second terminal. The second terminal receives the encrypted login information sent from the first terminal, and a second hardware logic circuit in the second encryption accessory decrypts the encrypted login information for the second terminal, the second hardware logic circuit in the second encryption accessory matching the first hardware logic circuit in the first encryption accessory. If the user features of the first user obtained on the first terminal is correct, the correct user features may be obtained through a successful decryption. The second encryption accessory compares whether the user features obtained through the decryption match the user features of the first user bound during the registration and if so, an access authentication is successful. After the access authentication is successful, the second encryption accessory sends back login response information to the first terminal through the second terminal.

Similarly, the second terminal can send login information encrypted by a second hardware function generated by the second encryption accessory to the first terminal. After an authentication succeeds on the second terminal, the first terminal can communicate with the second terminal.

In exemplary embodiments, the method 300 can also be applied to information interaction between one user and multiple users and between multiple users and multiple users.

Figure 4:
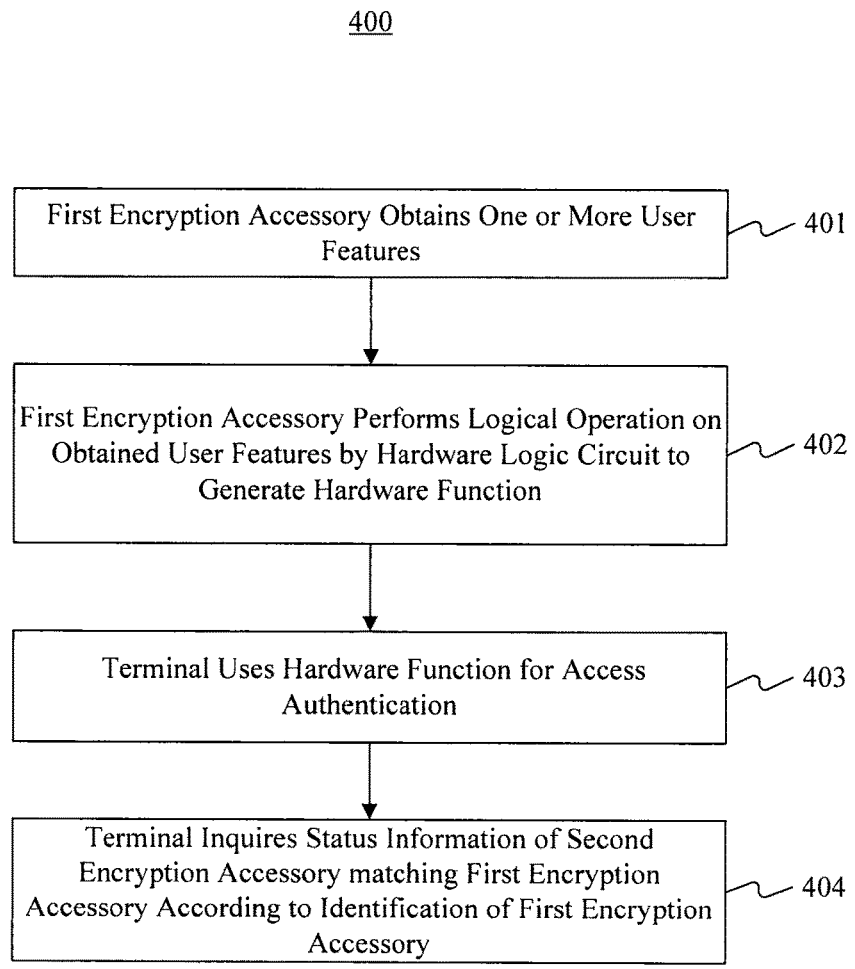

FIG. 4 is a flowchart of an information interaction method 400, according to an exemplary embodiment. Referring to FIG. 4, the method 400 includes the following steps.

In step 401, a first encryption accessory to the terminal obtains one or more user features of a first user. The obtained user features may be incompletely identical with those provided by the first user during registration, with a fault tolerance scope. For example, the user features can be a speech feature, a fingerprint feature, etc., with no limitation here.

In the illustrated embodiment, before logging onto an SNS server with the first encryption accessory, the first user needs to register with the SNS server. The first user is provided with the first encryption accessory which includes a hardware logic circuit matching a hardware logic circuit in the SNS server. During the registration, the first user may provide the SNS server with user features to bind the user features with the hardware logic circuit of the SNS server. After the registration, if the first user needs to log onto the SNS server, the first user may connect the first encryption accessory with the terminal to obtain the user features through a feature acquisition unit in the first encryption accessory.

In step 402, the first encryption accessory performs a logical operation on the obtained user features by the hardware logic circuit in the first encryption accessory, to generate a hardware function.

In step 403, the terminal uses the hardware function for an access authentication. For example, the terminal may send login information encrypted by the hardware function to the SNS server. The encrypted login information may include a user account and a password.

In exemplary embodiments, the SNS server receives the login information encrypted by the hardware function sent from the terminal, and performs a decryption on the encrypted login information through a hardware logic circuit matching the hardware logic circuit in the first encryption accessory. If the user features obtained on the terminal are correct, the correct user features may be obtained through a successful decryption by the SNS server. The SNS server further performs an access authentication on the user features obtained through the decryption by, e.g., performing a comparison to determine whether the obtained user features are identical with those bound during the registration.

After the access authentication is successful, the SNS server sends back login response information to the terminal. The terminal will enter into a user interface of the SNS and use applications in the SNS.

In step 404, the terminal inquires status information of a second encryption accessory matching the first encryption accessory according to an identification of the first encryption accessory. The status information includes information regarding if a second user of the second encryption accessory is online and from where the second user logs in, etc.

In one exemplary embodiment, the status information of the second user is directly shown on a symbolic pattern of a group of users, to which the first user and the second user belong, such as a brand, a logo, etc.

In exemplary embodiments, encryption accessories of the group of users match with each other. Each of the encryption accessories has its own identification. Therefore, encryption accessories of the same group of users can be registered with the SNS server, mutually encrypting and decrypting, and identified by each other.

In the embodiments, after a successful log-in of the second user, the SNS server can provide status information of the second user to the first encryption accessory according to the identification of the first encryption accessory. For example, the SNS server inquires if the second user of the second encryption accessory is online, and determines geographical location information of the second encryption accessory through the Internet according to the identification of the second encryption accessory.

Figure 5:
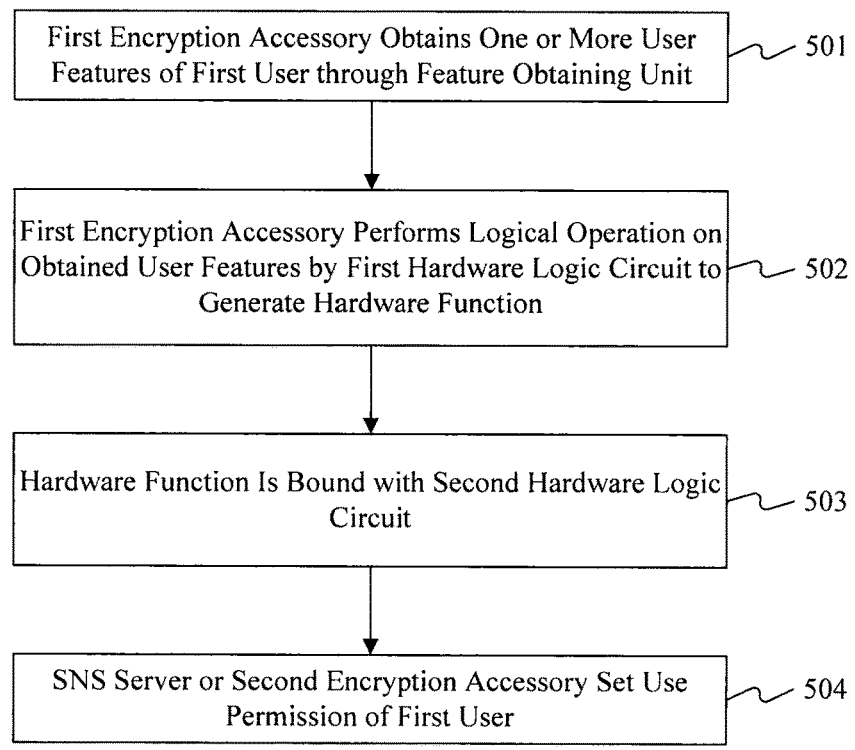
FIG. 5 is a flow chart of an information binding method, according to an exemplary embodiment.

FIG. 5 is a flowchart of an information binding method 500, according to an exemplary embodiment. For example, the method 500 can bind a hardware function including user features with a hardware logic circuit in an SNS server or an encryption accessory, i.e., the method 500 stores the hardware function including the user features for future use by the hardware logic circuit. The binding can be canceled by the SNS server, or the encryption accessory. The cancelling of the binding can be automatic, such as by setting an expiration time of the binding or a maximum number of uses of the user features. Referring to FIG. 5, the method 500 includes the following steps.

In step 501, a first encryption accessory obtains one or more features of a first user through a feature obtaining unit. For example, the feature obtaining unit includes one or more of a recording module, such as a camera module for obtaining a pupil feature of a user, and a fingerprint module for obtaining a fingerprint of the user.

In step 502, the first encryption accessory performs a logical operation on the user features using a first hardware logic circuit to generate a hardware function.

In step 503, the hardware function is bound with a second logic circuit, which can be a hardware logic circuit of an SNS server or a second encryption accessory.

In one exemplary embodiment, the second hardware logic circuit is the hardware logic circuit of the SNS server. Accordingly, the hardware function being bound with the second logic circuit includes that the SNS server uses the second hardware logic circuit to perform a logical operation to the hardware function, to obtain and store the user features of the first user.

In the embodiment, the binding, between the user features of the first user and the SNS server can be completed through a terminal. For example, the terminal can send the first hardware function to the SNS server after the first encryption accessory generates the first hardware function and connects with the terminal. The user features of the first user can thus be obtained by the SNS server through the second hardware logic circuit. Furthermore, the user features of the first user can be stored in account information of the first user.

In one exemplary embodiment, the first encryption accessory can be bound with software on the SNS server through the terminal to provide safety encryption for communication with the software. Furthermore, the software bound with the first encryption accessory and the first user bound with the first encryption accessory can be bound with each other. The binding can be between hardware and hardware, between hardware and software or between users, as well as between communication relations of two or more users.

In one exemplary embodiment, the hardware logic circuit is the hardware logic circuit of the second encryption accessory. Accordingly, the hardware function being bound with the second hardware logic circuit includes that the second encryption accessory uses the second hardware logic circuit to perform a logical operation to obtain and store the user features of the first user, similar to the binding described above between the user features and the SNS server.

In step 504, after binding the second hardware logic circuit with the hardware function including the user features of the first user, the SNS server or the second encryption accessory set use permission of the first user. The use permission includes a frequency of data exchange, one or more time slots of data exchange, an automatic information interaction, an automatic notification regarding data updates, or any combination thereof.

For example, the frequency of data exchange is the number of times the first user can use data interaction applications in the SNS. The data interaction can include communication and data transmission. Also for example, the time slots of data exchange are one or more specific times when the first user can use the SNS. Further for example, the automatic information interaction is that the terminal to which the first encryption accessory is connected is able to automatically download data from the SNS server or another encryption accessory when having Internet access. As another example, the automatic notification regarding data updates is that any data updates can be automatically notified when the terminal to which the first encryption accessory is connected has Internet access and passes access authentication.

Figure 6:
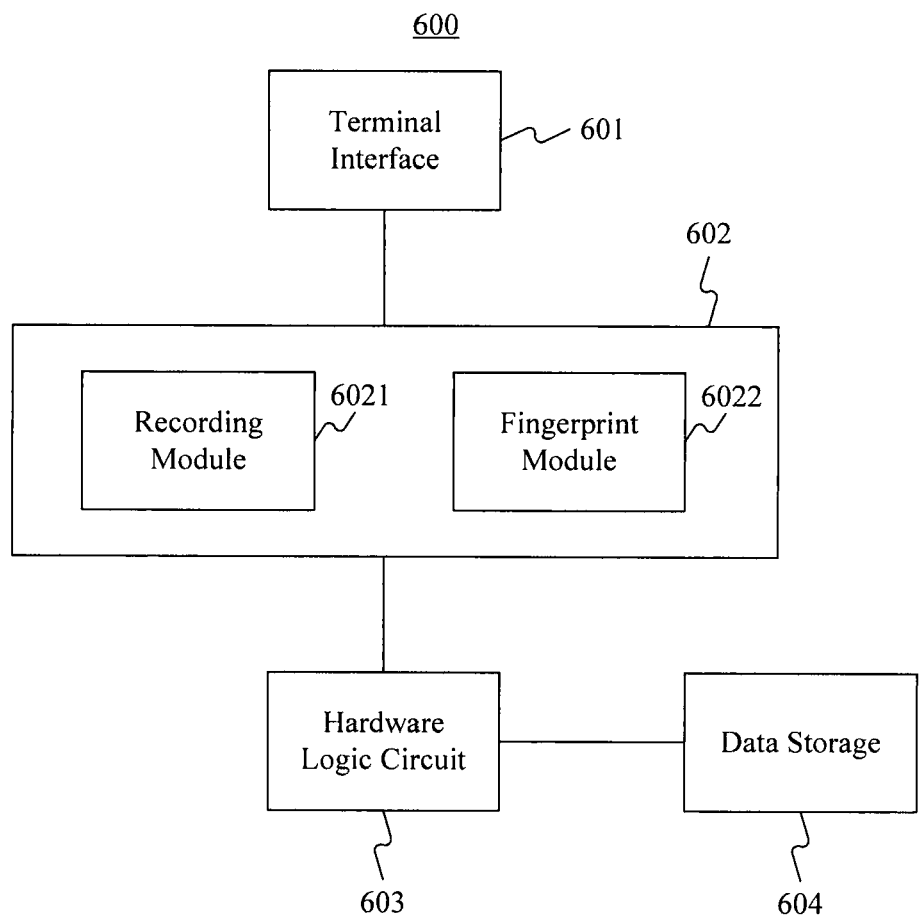
FIG. 6 is a block diagram of an encryption accessory, according to an exemplary embodiment.

FIG. 6 is a block diagram of an encryption accessory 600, according to an exemplary embodiment. Referring to FIG. 6, the encryption accessory 600 includes a terminal interface 601 configured to electrically connect the encryption accessory 600 with a terminal, such as a computer or a mobile terminal, a feature obtaining unit 602 configured to obtain one or more user features, and a hardware logic circuit 603 configured to perform a logical operation on the user features to generate a hardware function matching the user features, and transmit data encrypted with the hardware function to the terminal through the terminal interface 601.

In exemplary embodiments, the feature obtaining unit 602 includes a recording module 6021 and a fingerprint module 6022. For example, the recording module 6021 may be a camera module configured to obtain a pupil feature of the user, and the fingerprint module 6022 is configured to obtain a fingerprint feature of the user.

In exemplary embodiments, the hardware logic circuit 603 is configured to encrypt data to be transmitted with the hardware function, or decrypt received encrypted data with the hardware function.

In exemplary embodiments, the encryption accessory 600 also includes a data storage 604 configured to store the data encrypted with the hardware function.

In exemplary embodiments, the terminal interface 601 includes a universal serial bus (USB) or an audio interface. Additionally and/or alternatively, the terminal interface 601 includes a wireless network interface, such as one or more of a Bluetooth interface, a radio frequency identification (DFID) interface, a near field communication (NFC) interface, an infrared interface, a Zigbee interface, or a wireless fidelity (WiFi) interface.

In exemplary embodiments, the terminal interface 601 includes an audio receiving unit, an audio sending unit, a digital/analog converter (DAC), and/or an analog/digital converter (ADC). The audio receiving unit is configured to receive an audio signal sent from the terminal, and transmit the audio signal to the DAC. The audio sending unit is configured to receive an audio signal from the DAC, and send the audio signal to the terminal.

The ADC is configured to convert an analog audio signal into a digital signal. The DAC is configured to convert a digital signal into an analog audio signal.

The audio sending unit and the audio receiving unit are configured to transmit data between the terminal and the encryption accessory 600, including the user features and/or the hardware function.

Figure 7:
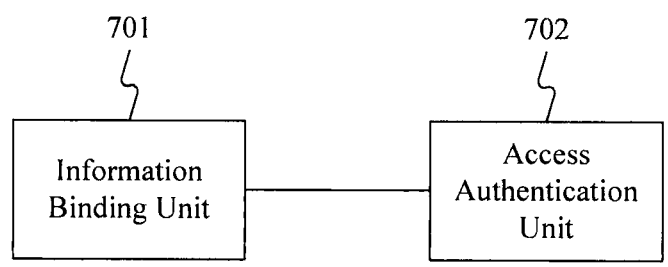
FIG. 7 is a block diagram of a social networking service (SNS) server, according to an exemplary embodiment.

FIG. 7 is a block diagram of an SNS server 700, according to an exemplary embodiment. Referring to FIG. 7, the SNS server 700 includes an information binding unit 701 configured to bind one or more user features provided by the user, and an access authentication unit 702. The access authentication unit 702 is configured to receive encrypted login information sent from the terminal and perform a decryption on the encrypted login information with a hardware logic circuit to obtain one or more user features. The access authentication unit 702 is further configured to compare the user features bound in the information binding unit 701 with the obtained user features to perform an access authentication of the terminal.

Figure 8:
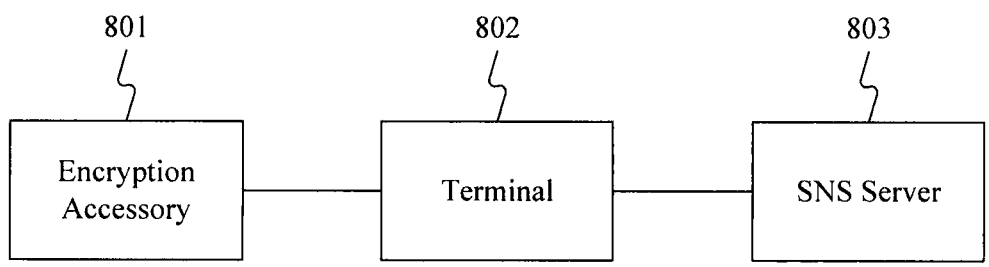
FIG. 8 is a block diagram of an SNS system, according to an exemplary embodiment.

FIG. 8 is a block diagram of an SNS system 800, according to an exemplary embodiment. Referring to FIG. 8, the SNS system 800 includes an encryption accessory 801, a terminal 802, and an SNS server 803. The encryption accessory 801 is connected with the terminal 802, and the terminal 802 can communicate with the SNS server 803.

In exemplary embodiments, the SNS server 803 is configured to bind one ore more user features provided by the user, receive encrypted login information from the terminal 802, and perform a decryption on the encrypted login information with a hardware logic circuit to obtain one or more user features. The SNS server 803 is further configured to compare the bound user features with the obtained user features to perform an access authentication of the terminal 802.

In exemplary embodiments, the encryption accessory 801 is configured to obtain one or more user features from the user and perform a logical operation on the user features to obtain a hardware function, and transmit user data, e.g., login information, encrypted with the hardware function via its terminal interface.

In exemplary embodiments, the terminal 802 is configured to receive the user data (e.g. login information) encrypted with the hardware function from the encryption accessory 801 and send the received user data (e.g. login information) encrypted with the hardware function for the SNS server 803 to perform the access authentication.

Figure 9:
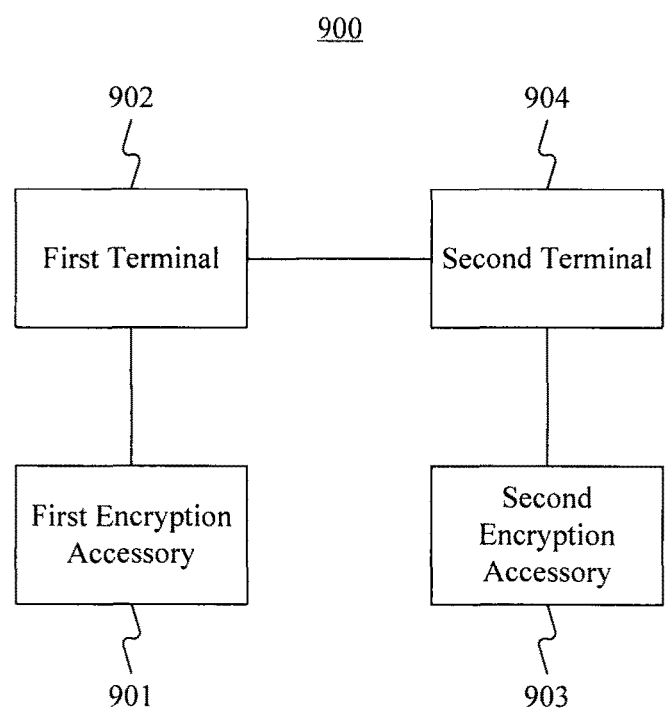
FIG. 9 is a block diagram of an SNS system, according to an exemplary embodiment.

FIG. 9 is a block of an SNS system 900, according to an exemplary embodiment. Referring FIG. 9, the system 900 includes a first encryption accessory 901, a first terminal 902, a second encryption accessory 903, and a second terminal 904. The first encryption accessory 901 is electrically connected with the first terminal 902, and the second encryption accessory 903 is electrically connected with the second terminal 904. The first terminal 902 can communicate with the second terminal 904.

In exemplary embodiments, the first encryption accessory 901 is configured to obtain one or more user features of a first user and perform a logical operation on the user features to generate a first hardware function. The first encryption accessory 901 is further configured to use the first hardware function to encrypt first user data (e.g. login information) of the first user and transmit the encrypted first user data (e.g. login information) to the first terminal 902. The first terminal 902 is configured to receive the encrypted first user data (e.g. login information) and send the encrypted first user data (e.g. login information) for the second terminal 904 to perform an access authentication with the second encryption accessory 903.

In exemplary embodiments, the second encryption accessory 903 is configured to obtain one or more user features of a second user and perform a logical operation on the user features of the second user to generate a second hardware function. The second encryption accessory 903 is further configured to use the second hardware function to encrypt second user data (e.g. login information) of the second user and transmit the encrypted second user data (e.g. login information) to the second terminal 904. The second terminal 904 is configured to receive the encrypted second user data (e.g. login information) by the second hardware function from the second encryption accessory 903 and send the encrypted second user data (e.g. login information) to the first terminal 902 to perform an access authentication with the first encryption accessory 901.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In exemplary embodiments, there is also provided a non-transitory computer-readable medium including instructions, executable by a processor, for performing the above described methods. For example, the non-transitory computer-readable medium may be a USB flash disk, a mobile hard disk drive (HDD), a read-only memory (ROM), a random access memory (RAM), a magnetic disk, a compact disk, or other media for storing program codes.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An information interaction method, comprising:
   obtaining, by a first encryption accessory, one or more user features, the first encryption accessory including a hardware logic circuit;
   performing, by the hardware logic circuit, a logical operation on the one or more user features to generate a hardware function;
   using the hardware function for an access authentication by a social networking service (SNS) server;
   obtaining an identity of the first encryption accessory; and
   inquiring status information of a second encryption accessory matching the first encryption accessory based on the identity of the first encryption accessory, the second encryption accessory being in communication with the first encryption accessory remotely,
   wherein the using of the hardware function for the access authentication comprises:
      encrypting, by the first encryption accessory, login information with the hardware function;
      sending the encrypted login information to the SNS server; and
      if the encrypted login information is correctly decrypted by the SNS server, receiving login response information from the SNS server, and entering into a use interface of the SNS, wherein the hardware function on SNS matches with the hardware function generated through said first encrypted accessory.

2. The method of claim 1, wherein the user features comprise at least one of:
   a speech feature, a fingerprint feature, a knuckle feature, a palm print feature, a face feature, or an eye iris feature.

3. The method of claim 1, further comprising:
   upon a successful access authentication by the SNS server, using the hardware function to transmit data to, and receive data from, the SNS server.

4. The method of claim 3, wherein the using of the hardware function to transmit data to, and receive data from, the SNS server comprises at least one of:
   encrypting data transmitted to the SNS server with the hardware function; or
   decrypting encrypted data received from the SNS server with the hardware function, to obtain the decrypted data.

5. The method of claim 1, further comprising:
   displaying the status information on an iconic logo of an SNS.

6. A communication system, comprising:
   a terminal; and
   a first encryption accessory, comprising:
      an interface for electrically connecting to the terminal;
      a feature obtaining unit for obtaining one or more user features; and
      a hardware logic circuit for performing a logical operation on the one or more user features to generate a hardware function, and transmitting the hardware function to the terminal via the terminal interface,
   wherein the terminal is configured to:
      encrypt login information with the hardware function;
      send the encrypted login information to a social networking service (SNS) server;
      if the encrypted login information is correctly decrypted by the SNS server, receive login response information from the SNS server, and enter into a use interface of the SNS, wherein the hardware function on the SNS matches with the hardware function generated through said first encrypted accessory;
      obtain an identity of the first encryption accessory; and
      inquire status information of a second encryption accessory matching the first encryption accessory based on the identity of the first encryption accessory, the second encryption accessory being in communication with the communication system remotely.

7. The communication system of claim 6, wherein the feature obtaining unit of the first encryption accessory comprises at least one of a camera module for acquiring a pupil feature, or a fingerprint acquisition module for acquiring a fingerprint feature.

8. The communication system of claim 6, wherein the hardware logic circuit of the first encryption accessory is configured to encrypt data to be transmitted from the first encryption accessory with the hardware function, and to decrypt encrypted data received by the first encryption accessory with the hardware function.

9. The communication system of claim 8, wherein the first encryption accessory further comprises:
   a data storage for storing the data encrypted with the hardware function.

10. The communication system of claim 6, wherein the interface of the first encryption accessory comprises one of:
    a universal serial bus (USB) interface or an audio interface.

11. The communication system of claim 6, wherein the interface of the first encryption accessory is a wireless network interface, including at least one of a Bluetooth interface, a radio-frequency identification (RFID) interface, a near field communication (NFC) interface, an infrared interface, a Zigbee interface, or a WiFi interface.

12. The communication system of claim 6, wherein the interface of the first encryption accessory comprises:
- an audio receiving unit;
- an audio transmitting unit; and
- a digital/analog converter (DAC) configured to convert a digital signal to an analog signal and to convert an analog signal to a digital signal;
- wherein the audio receiving unit is configured to receive a first audio signal from the terminal and transmit the first audio signals to the DAC; and
- the audio transmitting unit is configured to transmit a second audio signal received from the DAC to the terminal.

\* \* \* \* \*